United States Patent [19]

Hart et al.

[11] Patent Number: 4,848,498
[45] Date of Patent: Jul. 18, 1989

[54] COMBINED DOOR AND TOOL TRAY IN TRACTOR ENGINE HOUSING

[75] Inventors: Ronald E. Hart, Muscatine, Iowa; Robert T. Peterson, Gladstone, Ill.

[73] Assignee: J. I. Case Company, Racine, Wis.

[21] Appl. No.: 184,976

[22] Filed: Apr. 22, 1988

[51] Int. Cl.⁴ .............................................. B62D 25/10
[52] U.S. Cl. ...................................... 180/69.2; 49/70; 296/37.5; 296/152
[58] Field of Search ........................ 180/69.24, 69.2; 296/37.1, 37.5, 37.6, 37.13, 152; 49/70

[56] References Cited

U.S. PATENT DOCUMENTS

| | | | |
|---|---|---|---|
| 1,241,933 | 10/1917 | Deanes | 180/69.24 |
| 1,411,377 | 4/1922 | Robison | 296/152 |
| 1,694,855 | 12/1928 | Irons | 49/70 |
| 1,981,093 | 11/1934 | Conarroe | 362/80 |
| 2,661,233 | 12/1953 | Sidel | 296/152 |
| 2,833,365 | 5/1958 | Kesl et al. | 180/69.24 |
| 3,231,292 | 1/1966 | Lorenz | 296/37.1 X |
| 3,473,680 | 10/1969 | Downer | 296/37.1 X |
| 4,037,682 | 7/1977 | Sandrock et al. | 180/69.2 |
| 4,131,172 | 12/1978 | Wolfgram | 180/69.24 |
| 4,415,052 | 11/1983 | Gauer | 180/69.2 |
| 4,454,926 | 6/1984 | Akins | 180/68.1 |

Primary Examiner—David M. Mitchell
Assistant Examiner—Tamara L. Finlay
Attorney, Agent, or Firm—Peter N. Jansson, Ltd.

[57] ABSTRACT

An improved vertical service door for a tractor engine housing of the vertically-hinged horizontally swingable type. The vertical service door has a lower panel hinged to the lower edge of an upper panel, and means to support the lower panel in a horizontal position when the door is open so that it may serve as a tool tray during engine service. Some preferred embodiments include an inwardly-turned edge forming a vertical retaining edge for the tray and a rod/J-slot linkage between the upper and lower panels to support the lower panel in its horizontal position.

14 Claims, 2 Drawing Sheets

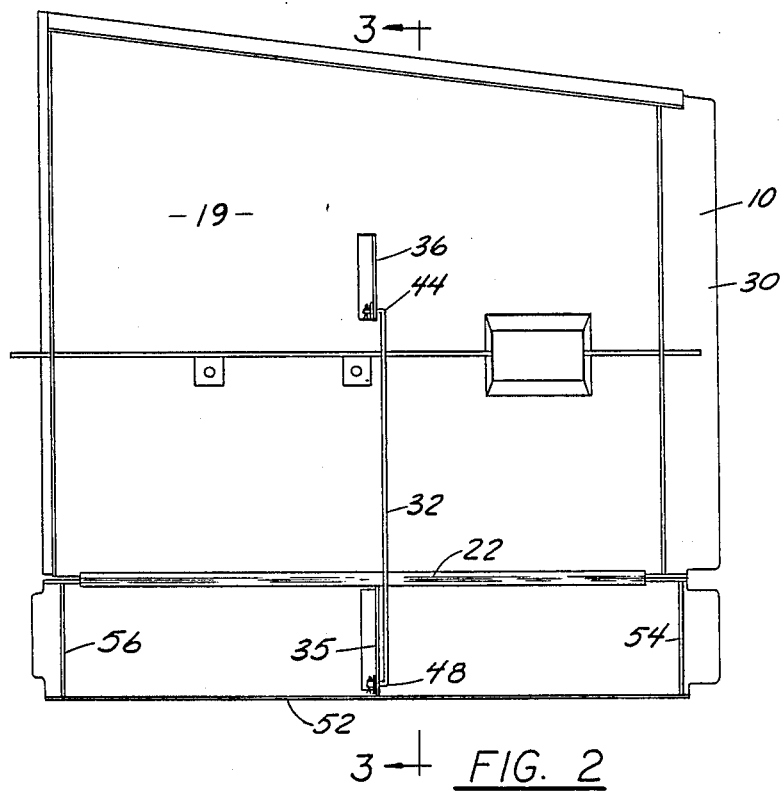
FIG. 2
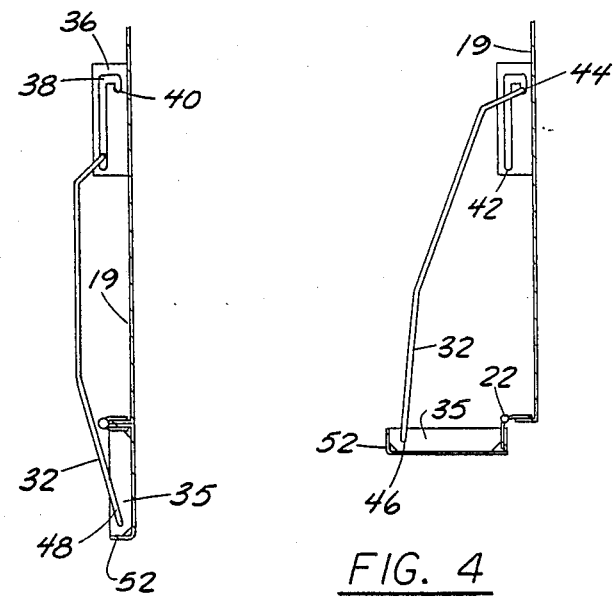
FIG. 3
FIG. 4

COMBINED DOOR AND TOOL TRAY IN TRACTOR ENGINE HOUSING

FIELD OF THE INVENTION

This invention is related generally to housings for tractor engines and, more particularly, to service doors in tractor engine housings

BACKGROUND OF THE INVENTION

A great variety of service doors in tractor engine housings have been developed to provide access to engines for purposes of service. Some examples of such prior engine-housing service doors are disclosed in the following U.S. Pat. Nos.:

1,241,933 (Deanes)
1,981,093 (Conarroe)
2,833,365 (Kesl et al.)
4,037,682 (Sandrock et al.).
4,131,172 (Wolfgram)
4,415,052 (Gauer)
4,454,926 (Akins)

During servicing of a tractor engine, which typically requires opening of a service door, the service person's tools are typically placed in a variety of places, such as on engine surfaces, external tractor surface, nearby benches or the like. Therefore, such tools in many cases are not readily and conveniently accessible to the service person during engine work.

In some cases, tools have even been misplaced or lost somewhere on today's complex tractor engine surfaces or inside the engine cavity. Moreover, tools set on certain surfaces, particularly engine surfaces, are sometimes prone to fall from engine surfaces and become lost.

There is a clear need for an improved system for supporting tools in an accessible position during engine servicing.

OBJECTS OF THE INVENTION

It is an object of this invention to provide an improved horizontally-swingable service door for a tractor engine housing which overcomes problems and shortcomings of the prior art, including those mentioned above.

Another object of this invention is to provide an improved service door for an engine enclosure.

It is an object of this invention to provide a tool tray readily accessible to service persons during servicing of tractor engines.

These and other important objects will be apparent from the descriptions of this invention which follow.

SUMMARY OF THE INVENTION

This invention is an improved engine-housing service door which overcomes certain problems and disadvantages of prior art devices, including those mentioned above. More specifically, this invention is a service door of the type which is vertical and which swings outwardly in a horizontal direction (laterally) about a vertical hinge at the proximal edge of the door.

The doors of this invention have two panels—an upper panel and a lower panel. The aforementioned vertical hinge is attached to, or part of, only the upper panel. Such vertical hinge attaches the upper panel to the remainder of the engine housing or some other part adjacent to the service door. The lower panel is hingedly attached to the lower edge of the upper panel. In its normal position, the lower panel is coplanar with the upper panel; it appears and functions with the upper panel as an integral service door. Such two-panel door fits the door opening in the same manner as a single-panel door.

When the service door of this invention is open, its lower panel may be swung upwardly, and preferably inwardly, such that it forms a horizontal tray. A means is provided to support the lower panel in such raised horizontal position. The support means preferably is a support linkage extending between the lower panel and the upper panel. Most preferably, the linkage includes lower and upper attachment means on the lower and upper panels, respectively, and a rod (or rods) with bottom and top ends engaged with the lower and upper attachment means, respectively. Such rod is preferably along the inside surface of the door.

In a particularly preferred form, one of the lower and upper attachment means is a wall-affixed attachment member having a hole pivotably receiving one end of the rod, while the other attachment means is another wall-affixed attachment member which forms a J-shaped slot slidably receiving the other end of the rod. The latter such attachment member, with the J-slot, is preferably on the upper panel, with the J-slot therein being oriented as an inverted J.

In such preferred embodiment, the top end of the rod or rods, which includes a horizontal slot-engaging portion, moves within the slot as the position of the lower panel changes between its vertical door-forming position and its horizontal tray-forming position. In the former position the top end of the rod is at the end of the longer vertical portion of the J-slot, while in the latter position it is at the end of the shorter vertical portion of the J-slot, where it supports the tray in its horizontal position. The position of the lower panel is adjusted manually.

The rod is preferably substantially vertical, and most preferably located about midway between the proximal and distal edges of the service door. This positioning provides good balanced support for the lower panel when it is functioning as a tool tray, and does so with only one rod. The rod also preferably runs, at its bottom end, to the lowermost part of the lower panel.

In certain highly preferred embodiments, the lower panel includes has a bottom edge which is inwardly-turned such that it forms a vertical retaining edge when the lower panel is in its horizontal position, serving as a tool tray. Such edge helps to retain tools on the tray.

BRIEF DESCRIPTION OF THE DRAWINGS

FIG. 2 is a rear elevation of the service door which is shown in FIG. 1.

FIG. 3 is a side sectional view taken along section 3—3 as indicated in FIG. 2.

FIG. 4 is a side sectional view as in FIG. 3, but illustrating the lower panel in its raised horizontal position for service as a tool tray.

DETAILED DESCRIPTION OF PREFERRED EMBODIMENTS

Figure 1:
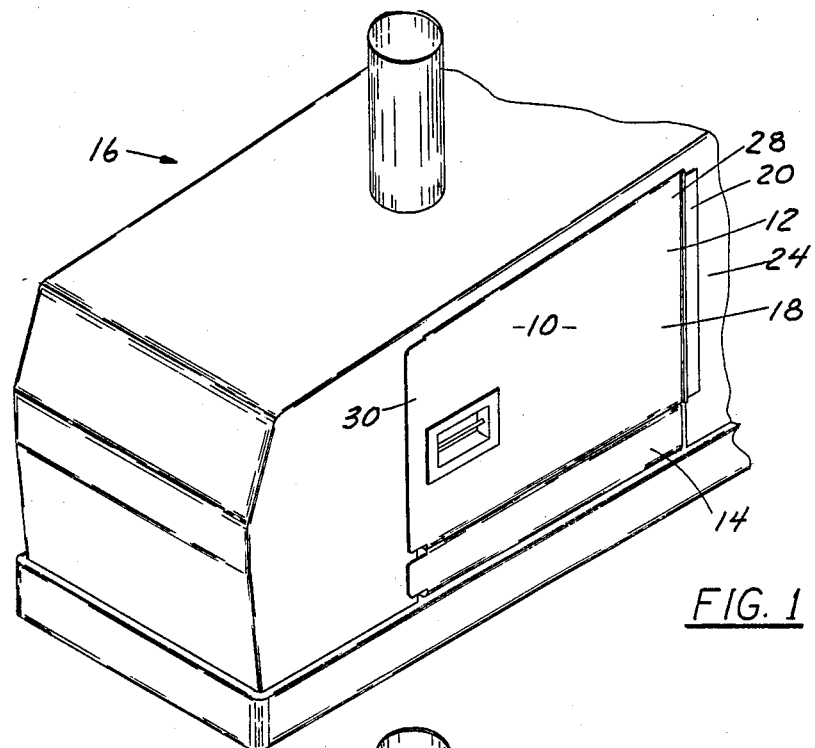
FIG. 1 is a fragmentary perspective view of a tractor engine housing including an improved service door in accordance with this invention.

The drawings illustrate a preferred tractor engine housing 16 and a preferred service door 10 in accordance with this invention. Service door 10 has an upper panel 12 and a lower panel 14. Lower panel 14 can pivot inwardly to form a tool tray, as illustrated in FIGS. 4 and 5.

Service door 10 has an outside surface 18 and an inside surface 19, and is hinged to engine housing 16 by means of hinge 20. Lower panel 14 is hinged to upper panel 12 by means of a hinge 22. When closed, service door 10 covers a service opening 50 in engine housing 16. Service opening 50 is bordered by a near edge 24 and a far edge 26, hinge 20 being attached at near edge 24. Service door 10 has a proximal edge 28 and a distal edge 30. Proximal and distal edges 28 and 30 are aligned with near and far edges 24 and 26, respectively.

Figure 5:
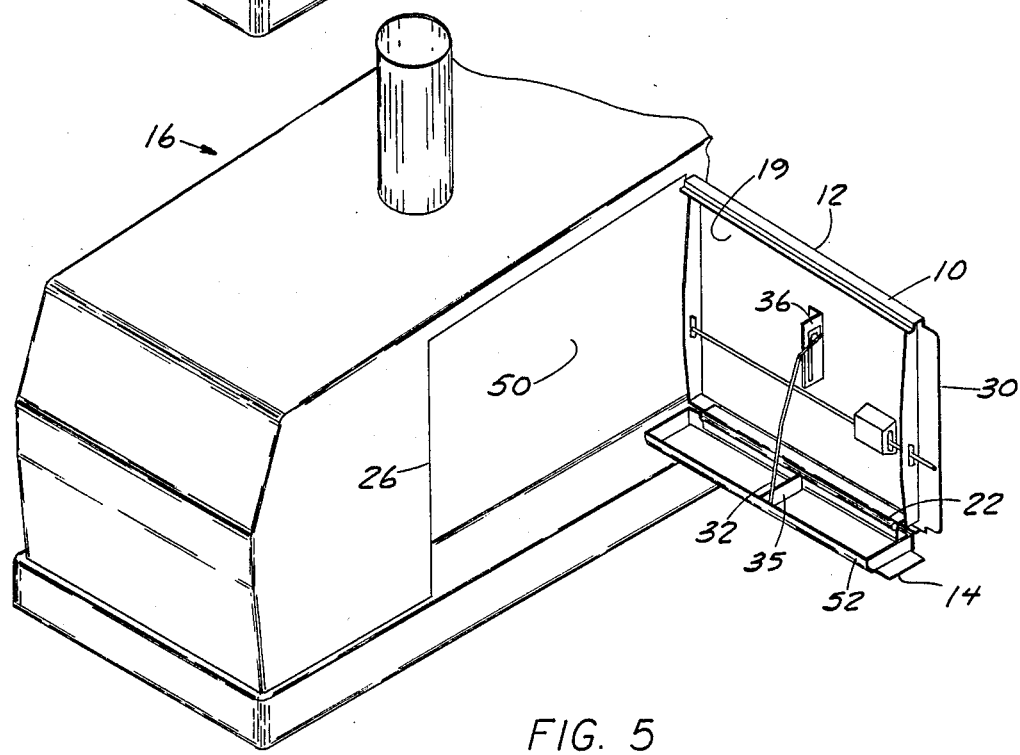
FIG. 5 is a perspective view as in FIG. 1, but showing the service door in its open position and the lower panel in its horizontal position

Hinge 22 allows lower panel 14 to move between its normal vertical orientation (see FIGS. 1-3), in which it is coplanar with upper panel 12, and its horizontal tool-tray position (see FIGS. 4 and 5). Movement to the horizontal tool-tray position is easily done by the operator by hand.

Lower panel 14 is supported in such horizontal tool-tray position by means of a rod 32 and a pair of rod-attachment means. Rod 32 extends along inside surface 19 of service door 10. The two rod-attachment means include a lower attachment member 35 and an upper attachment member 36, both affixed on inside surface 19, to lower panel 14 and upper panel 12, respectively.

Lower attachment member 35 is secured to lower panel 14 near the bottom edge thereof, which is the bottom edge of service door 10, at a position about midway between proximal and distal edges 28 and 30. Upper attachment member 36 is secured to upper panel 12 generally near the center thereof, at a position about midway between proximal and distal edges 28 and 30. Thus, rod 32 extends between lower and upper attachment members 35 and 36 in a substantially vertical orientation.

Upper attachment member 36 includes an inverted J-shaped slot (or "J-slot") 38. J-slot 38 includes a first end 40 and a second end 42 and slidably receives a horizontal top end portion 44 of rod 32. Lower attachment member 35 has a hole 46 which pivotably receives a horizontal bottom end portion 48 of rod 32.

Top end portion 44 of rod 32 is at first end 40 of J-slot 38 when lower panel 14 is in its horizontal tool-tray position. Top end portion 44 of rod 32 is at second end 42 of J-slot 38 when lower panel 14 is in its normal vertical-door position. As the lower panel 14 is moved from one position to the other, top end 44 of rod 32 slides within J-slot 38.

Lower panel 14 has an inwardly-turned bottom edge wall 52 and end walls 54 and 56. Walls 52, 54 and 56 all serve as vertical retaining edges when lower panel 14 is serving as a tool tray.

The engine-housing service door of this invention may be made using sheet metal, steel strips, steel angles, hinges, various connectors and other parts. Plastic, fiberglass and/or other materials may be used. Fabrication methods would be apparent to those skilled in the art who are familiar with this invention.

While the principles of this invention have been described in connection with specific embodiments, it should be understood clearly that these descriptions are made only by way of example and are not intended to limit the scope of the invention.

What is claimed:

1. In a tractor engine housing of the type forming a service opening and having over such opening a substantially vertical service door with an inside surface, a bottom edge, a proximal edge and a distal edge, said door swingable outwardly in a horizontal direction about a substantially vertical hinge at the proximal edge, the improvement comprising:
    an upper panel having the hinge attached thereto, the upper panel having a lower edge;
    a lower panel hinged to the upper panel along the lower edge thereof, the upper and lower panels being substantially vertical and coplanar and covering upper and lower portions, respectively, of the service opening; and
    means to support the lower panel in a substantially horizontal position, substantially perpendicular to the upper panel, when the door is open,
whereby the lower panel may serve as a tool tray during engine service.

2. The service door of claim 1 wherein the lower panel extends inwardly when in the substantially horizontal position.

3. The service door of claim 2 wherein the bottom edge has an inwardly-turned edge which forms a vertical retaining edge when the lower panel is serving as a tray, thereby helping to retain tools.

4. The service door of claim 1 wherein the supporting means comprises a support linkage extending between the lower panel and the upper panel.

5. The service door of claim 4 wherein the support linkage is adjacent to the inside of the door.

6. In a substantially vertical service door for a tractor engine housing of the type with an inside surface, a bottom edge, a proximal edge and distal edge, and which swings outwardly in a horizontal direction about a substantially vertical hinge at the proximal edge, the improvement comprising:
    an upper panel having the hinge attached thereto, the upper panel having a lower edge;
    a lower panel hinged to the upper panel along the lower edge thereof; and
    means to support the lower panel in a substantially horizontal position when the door is open, said support means including first an second attachment means on the lower and upper panels, respectively, one of the attachment means having separate points of attachment for the vertical and horizontal positions of the lower panel, and a rod extending between the lower and upper panels and having bottom and top ends engaging the first and second attachment means, respectively,
whereby the lower panel may serve as a tool during engine service.

7. The service door of claim 6 wherein the rod is adjacent to the inside of the door.

8. The service door of claim 6 wherein said one attachment means forms a J-slot slidably receiving one of the rod ends.

9. The service door of claim 8 wherein said one attachment means is on the upper panel, the J-slot therein oriented as an inverted J.

10. The service door of claim 9 wherein the rod is adjacent to the inside of the door.

11. The service door of claim 7 wherein the rod is oriented substantially vertically.

12. The service door of claim 11 wherein the rod is positioned about midway between the proximal and distal edges to provide good support for the tray with only one rod.

13. The service door of claim 12 wherein the lower panel extends inwardly when in the substantially horizontal position.

14. The service door of claim 13 wherein the bottom edge has an inwardly-turned edge which forms a vertical retaining edge when the lower panel is serving as a tray, thereby helping to retain tools.

* * * * *